US012768377B2

(12) United States Patent
Gaebel

(10) Patent No.: US 12,768,377 B2
(45) Date of Patent: Oct. 20, 2026

(54) GLASS PANEL CLAMP ASSEMBLY

(71) Applicant: C.R. Laurence Co., Inc., Los Angeles, CA (US)

(72) Inventor: Marco Gaebel, Los Angeles, CA (US)

(73) Assignee: C.R. LAURENCE CO., INC., Los Angeles, CA (US)

( * ) Notice: Subject to any disclaimer, the term of this patent is extended or adjusted under 35 U.S.C. 154(b) by 266 days.

(21) Appl. No.: 18/586,348

(22) Filed: Feb. 23, 2024

(65) Prior Publication Data

US 2025/0271010 A1 Aug. 28, 2025

(51) Int. Cl.
*F16B 2/06* (2006.01)

(52) U.S. Cl.
CPC .................................... *F16B 2/065* (2013.01)

(58) Field of Classification Search
CPC .............. E04F 11/1853; E04F 11/1851; F16B 2200/403; F16B 2200/406; F16B 2200/40; F16B 2/065; Y10S 403/09; Y10T 403/7066; Y10T 403/7067
USPC .............................. 403/374.3, 374.2, DIG. 9
See application file for complete search history.

(56) References Cited

U.S. PATENT DOCUMENTS 4,469,466 A * 9/1984 Hotz ..................... F16B 5/0216 403/388
5,655,865 A * 8/1997 Plank .................... F16B 37/045 403/258
8,240,111 B2 * 8/2012 Feigl .................. E04F 11/1851 52/832
9,453,357 B1 9/2016 Bertato
11,473,359 B2 10/2022 Windmann
2017/0355218 A1 12/2017 Frielingsdorf et al.
2018/0002958 A1 1/2018 Mironchuk et al.

FOREIGN PATENT DOCUMENTS

| | | | |
|---|---|---|---|
| DE | 10132963 C1 * | 11/2002 | ....... B32B 17/10036 |
| DE | 10210503 A1 * | 9/2003 | ............. F16B 5/025 |
| EP | 1176320 B1 | 1/2002 | |
| EP | 2042070 | 1/2009 | |
| GB | 2417677 | 8/2006 | |
| GB | 2609972 | 2/2023 | |

* cited by examiner

*Primary Examiner* — Amber R Anderson
*Assistant Examiner* — Zachary A Hall
(74) *Attorney, Agent, or Firm* — Cisio & Thomas LLP

(57) ABSTRACT

An improved glass panel clamp assembly which may be entirely installed from the outside of a shower enclosure, is presented. The improved glass panel clamp assembly includes a clamp base and a clamp plate where the clamp base is configured with a slot for the receipt of a floating nut. The use of a floating nut on the clamp base eliminates the need for an installer to access the interior of the shower enclosure to secure a glass panel between the clamp base and the clamp plate. The improved glass panel clamp assembly also includes trim panels which secured to exposed faces of both the clamp base and the clamp plate to provide for improved aesthetic appearance.

18 Claims, 10 Drawing Sheets

PRIOR ART

GLASS PANEL CLAMP ASSEMBLY

BACKGROUND OF THE INVENTION

Field of the Invention

The present invention relates generally to shower enclosures and more particularly to a clamp assembly suitable for securing glass panels to the floor or sill of a shower enclosure.

BACKGROUND OF THE INVENTION

Shower enclosure design has achieved a significant level of importance in the overall appearance of a home with shower enclosures having one or more glass panels now being preferred by consumers. Typically, glass panels are installed on shower floors or sills by means of a clamp assembly that includes a base which attaches to the floor or sill and a clamp plate where a glass panel is sandwiched between a vertical panel extending from the clamp base and the clamp panel. Prior art glass panel clamp assemblies require access to both the interior and exterior of the shower enclosure to install. Having to access both the interior and exterior of the shower enclosure to install the glass panel clamp assembly to the shower floor and to secure it to a glass panel is cumbersome for an installer and consequently, increases installation time and thus installation cost.

What is needed in the art therefore is a glass panel clamp assembly that can be installed entirely from outside the shower enclosure, thereby eliminating the need to access the interior of the enclosure. Such a clamp assembly would decrease installation time and consequently installation costs and would improve the aesthetics of the glass panel installation.

SUMMARY OF THE INVENTION

The glass panel clamp assembly system of the present invention improves upon the prior art by providing a clamp assembly that can be installed from outside the shower enclosure, thus saving installation time and cost.

The glass panel clamp assembly of the present invention includes a clamp base, a clamp plate, a floating nut, a clamp screw, a rear trim panel and a front trim panel. When the glass panel clamp assembly is installed, a glass panel is secured between a vertical plate of the clamp base and the clamp plate. The clamp base is configured so as to be attachable to a shower floor or sill from outside the shower enclosure. The clamp base comprises the vertical plate and a floor mounting tab which extends horizontally outwardly from the vertical plate. The vertical plate of the clamp base features a nut access region and a slot for the retention of the floating nut. In the exemplary embodiment, the nut access region and the slot are configured vertically on the vertical plate, but may be oriented horizontally or in any desired orientation.

The floating nut is configured with a rim to engage the of the slot in the vertical plate of the clamp base and also includes flats which engage with flat surfaces in the slot to prevent the floating nut from rotating upon installation of the clamp screw. The clamp plate includes a hole for receipt of the clamp screw. When installed, a glass panel is sandwiched between the vertical plate of the clamp base and the clamp plate and is held in place via compression between the clamp base and plate generated by tightening the clamp screw.

The glass panel includes a clearance hole which allows the glass panel to be installed against the vertical plate of the clamp base with the floating nut protruding through the hole in the glass panel. Compressive force is applied to the clamp base, glass panel and clamp plate via the clamp screw which is inserted through the clamp plate and which engages with the floating nut secured in the slot of the vertical plate of the clamp base. The clamp plate is located outside of the shower enclosure when the glass panel clamp assembly is installed. The clamp screw is inserted and tightened from outside the shower enclosure.

The rear trim panel is installed over the vertical plate of the clamp base prior to installation in the shower floor or sill. The rear trim panel includes a protrusion that slides through a locating hole in the nut access region in the vertical plate of the clamp base and engages with the floating nut and holds the floating nut in position during assembly. The front trim panel is installed over the clamp plate and covers the clamp screw.

The vertical plate of the clamp base and the clamp plate include edge protrusions that engage with mating recesses formed in the front and rear trim covers, respectively. The configuration of edge protrusions and mating recesses allows the rear and front trim covers to snap over the vertical plate of the clamp base and the clamp plate, respectively. The front and rear trim panels provide the glass panel clamp assembly with a pleasing aesthetic appearance.

The above and other advantages of the glass panel clamp assembly of the present invention will be described in more detail below.

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
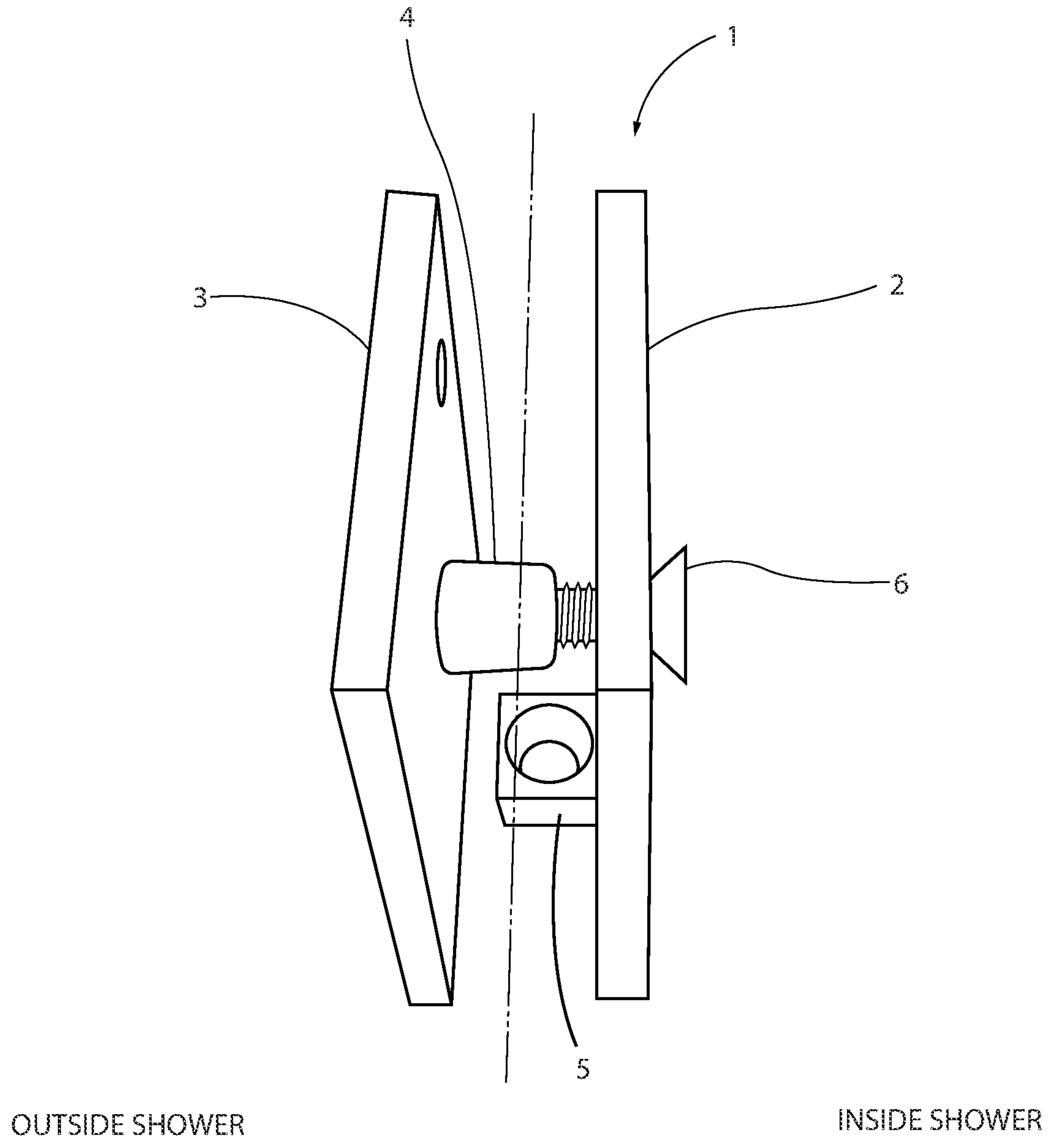
FIG. 1 is a perspective view of a prior art glass panel clamp assembly.

With reference to FIG. 1, a prior art glass panel clamp assembly 1 is shown. The prior art glass panel clamp assembly 1 comprises a prior art clamp base 2, a prior art clamp plate 3 and a clamp screw 6. The prior art clamp base 2 is a vertically oriented plate having a centrally located, floor mounting tab 5, which attaches to a shower floor or sill on the inside of the shower enclosure. A clearance hole is provided in the prior art clamp base 2 to allow the clamp screw 6 to pass thorough the clamp base and engage with a threaded boss 4, which is integrally formed as part of the prior art clamp plate 3. During assembly, a glass panel (not shown) which includes a locating hole is oriented so as to abut a face of the prior art clamp plate 3, with the threaded boss 4 extending through the locating hole in the glass panel.

With the prior art glass panel clamp assembly shown in FIG. 1, when the glass panel is positioned on the clamp base, to tighten the clamp screw 6 an installer must be able to access the interior of the shower enclosure. Having to access the interior of the shower enclosure with the glass panel positioned is cumbersome for an installer due to a relative lack of space within the enclosure and consequently, increases installation time and thus installation costs. In view of the drawbacks of the prior art glass panel clamp assembly of FIG. 1, it is evident that an improved glass panel clamp assembly that does not require access to the interior of the shower enclosure to install, is desirable.

One solution to the problem would appear to be to simply move the threaded boss 4 from the prior art clamp plate 3 to the prior art clamp base 2. This solution is not practical however, as the threaded boss 4, when moved to the prior art clamp base 2, blocks tool access to the mounting hole in the floor mounting tab 5. While two mounting tabs could be installed, one at each end of the clamp base, to alleviate the blockage problem, this would require an additional installation step as two screws per prior art clamp base 2 would then need to be driven into the shower floor or sill, which is undesirable from an efficiency of installation perspective.

Figure 2:
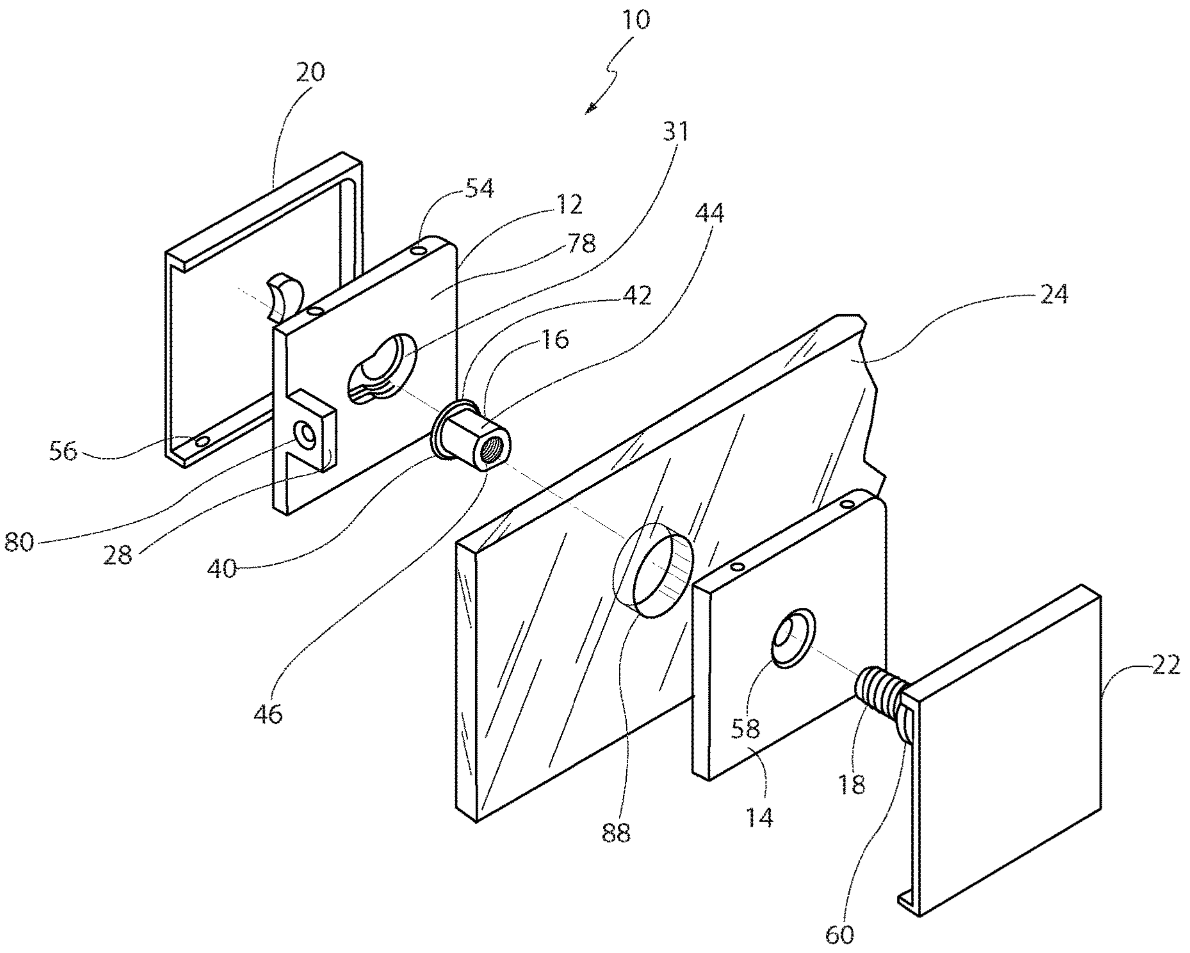
FIG. 2 is an exploded perspective view of the glass panel clamp assembly of the present invention, rotated 90 degrees clockwise from vertical for clarity.
Figure 3:
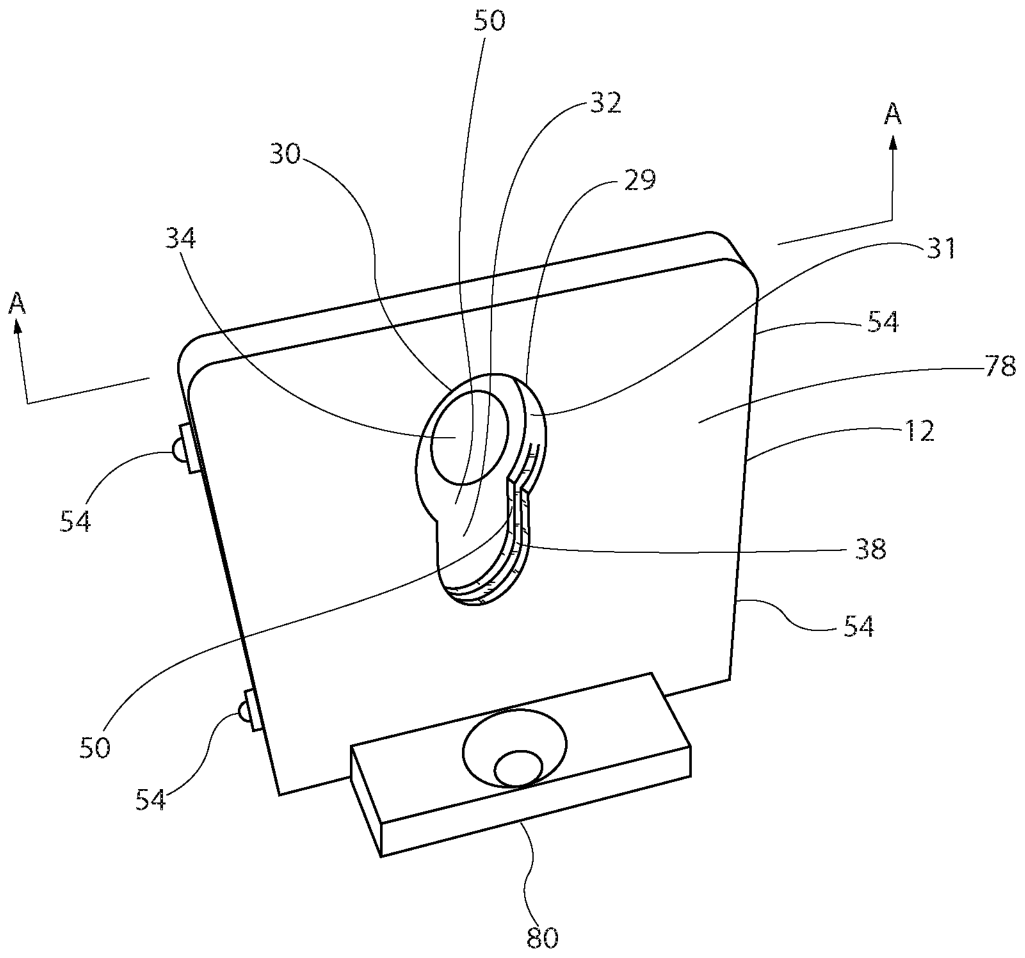
FIG. 3 is a perspective view of the clamp base of the glass panel clamp assembly of FIG. 2.
Figure 4:
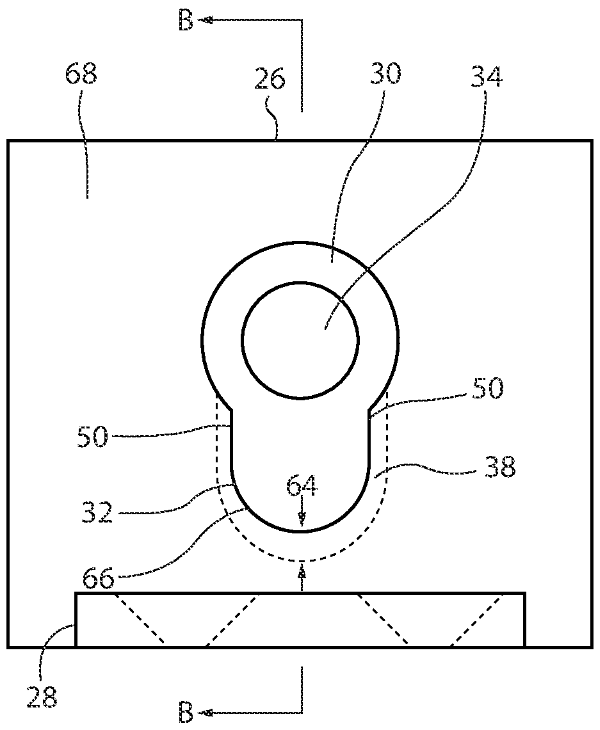
FIG. 4 is a front view of the clamp base of the glass panel clamp assembly of FIG. 2.
Figure 5:
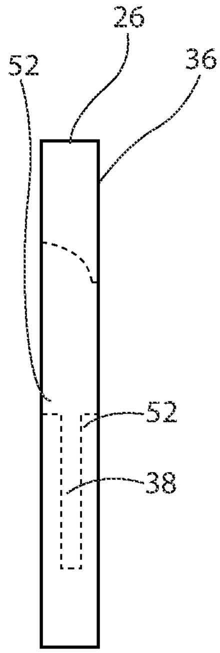
FIG. 5 is a side view of the clamp base of the glass panel clamp assembly of FIG. 2.
Figure 6:
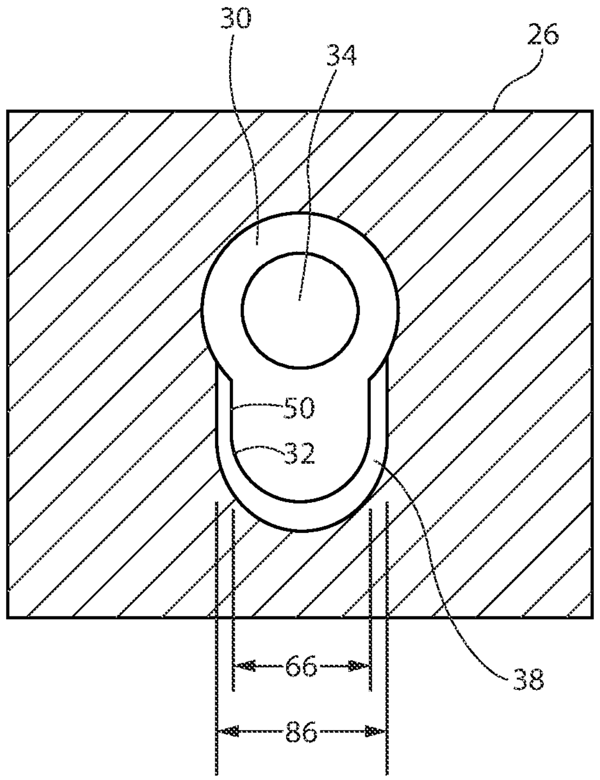
FIG. 6 is a sectional view taken along the line A-A of FIG. 3.
Figure 7:
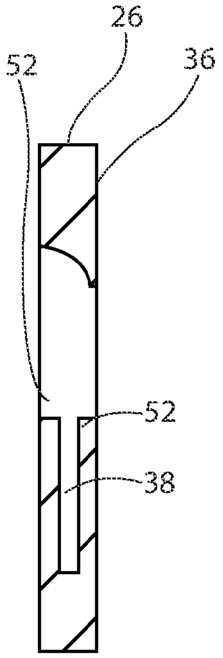
FIG. 7 is a sectional view taken along the line B-B of FIG. 4.
Figure 8:
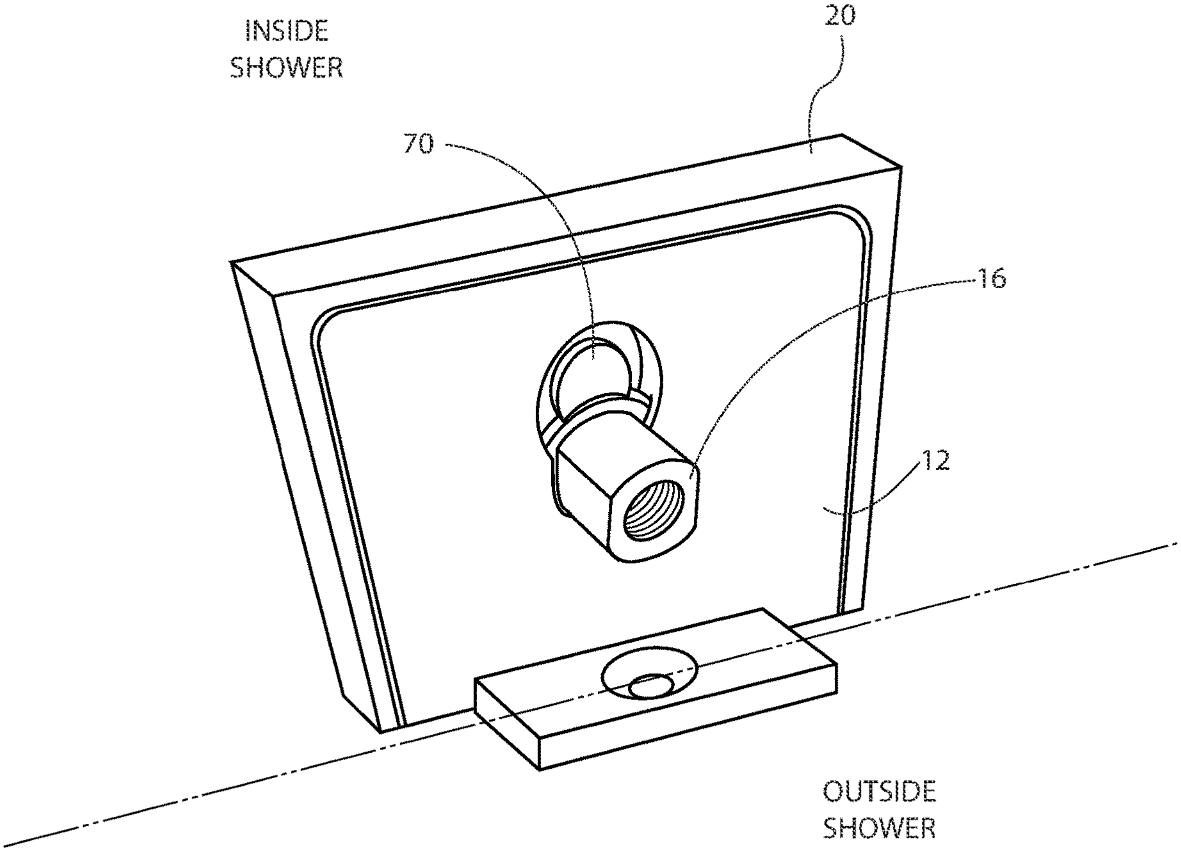
FIG. 8 is a perspective view of the clamp base of the glass panel clamp assembly of FIG. 2 showing a floating nut and a rear trim cover installed.
Figure 9:
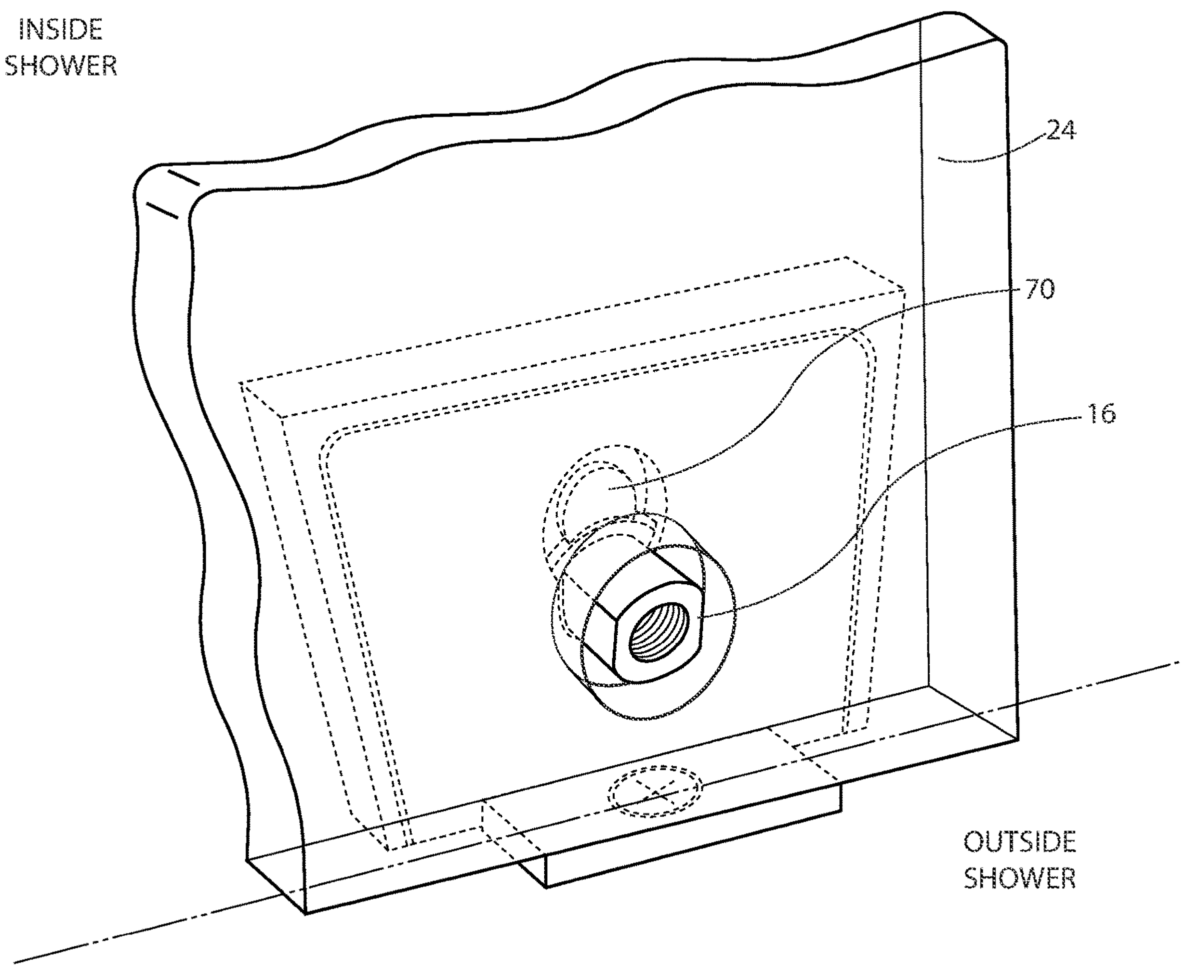
FIG. 9 is a perspective view of the clamp base of the glass panel clamp assembly of FIG. 2 showing a floating nut, rear trim cover and glass panel installed.
Figure 10:
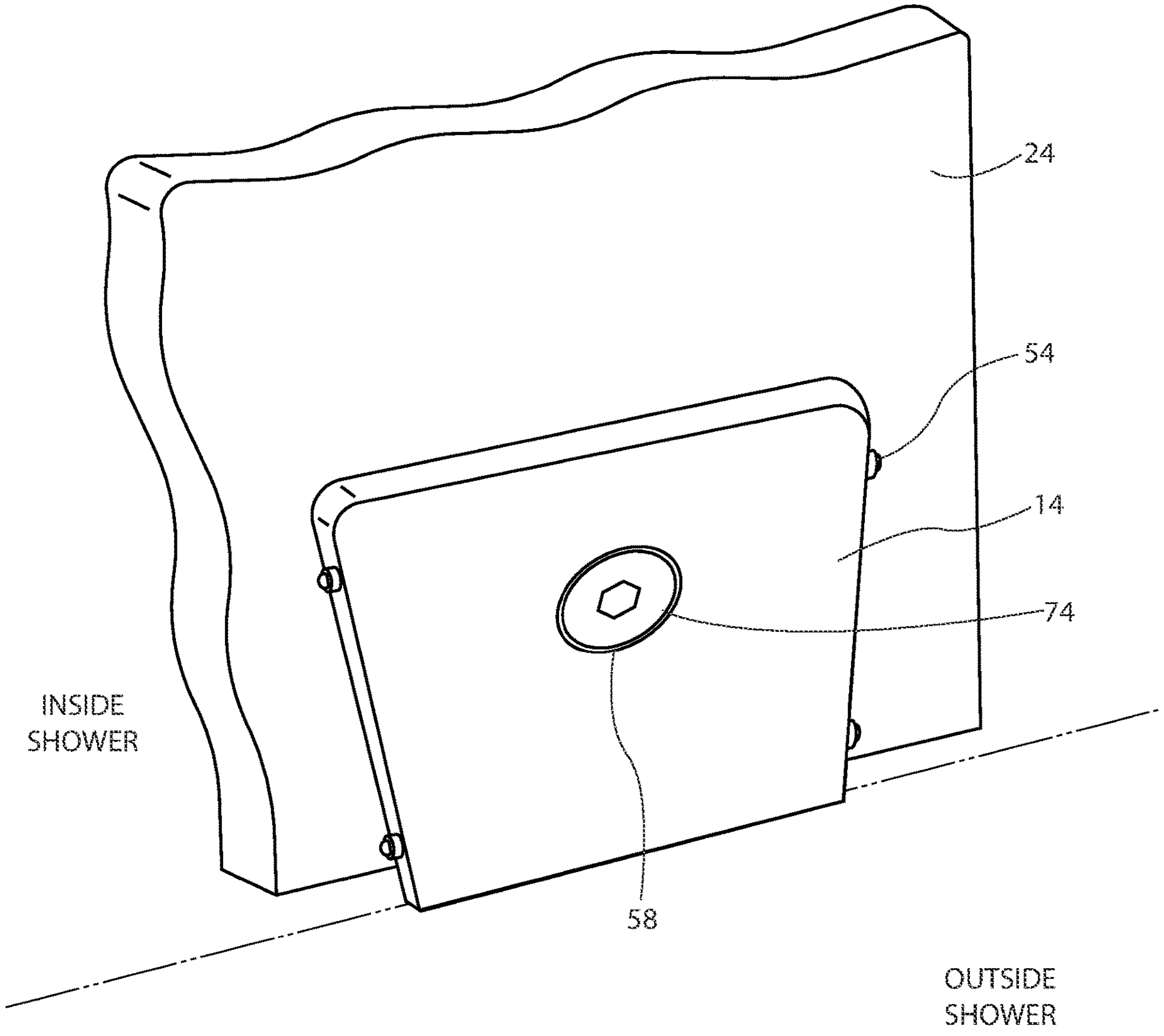
FIG. 10 is a perspective view of an assembled glass panel clamp assembly of the present invention with the front trim cover removed to illustrate the installed clamp panel and clamp screw.
Figure 11:
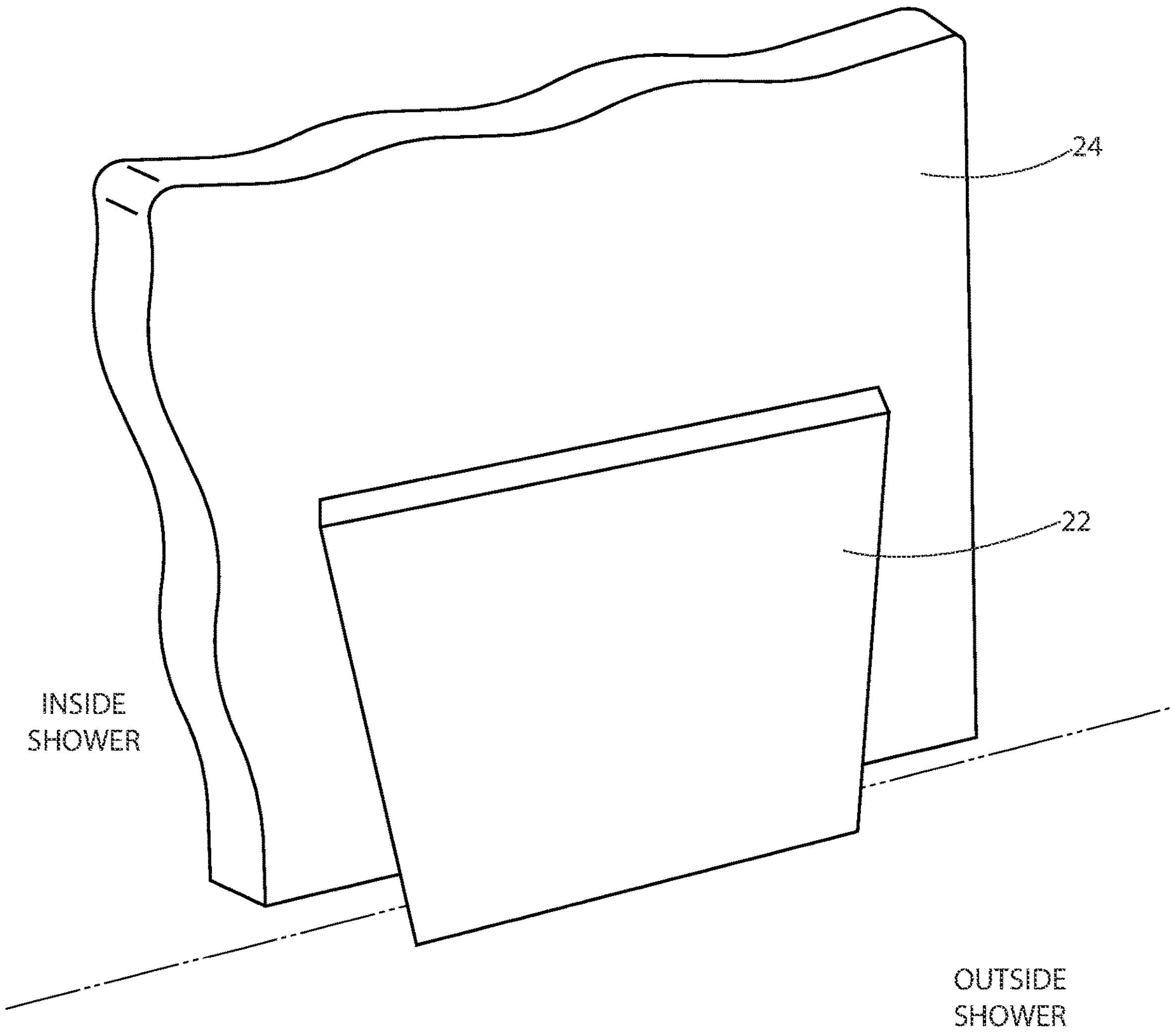
FIG. 11 is a perspective view of an assembled shower panel clamp assembly of the present invention with the front trim cover installed.
Figure 12:
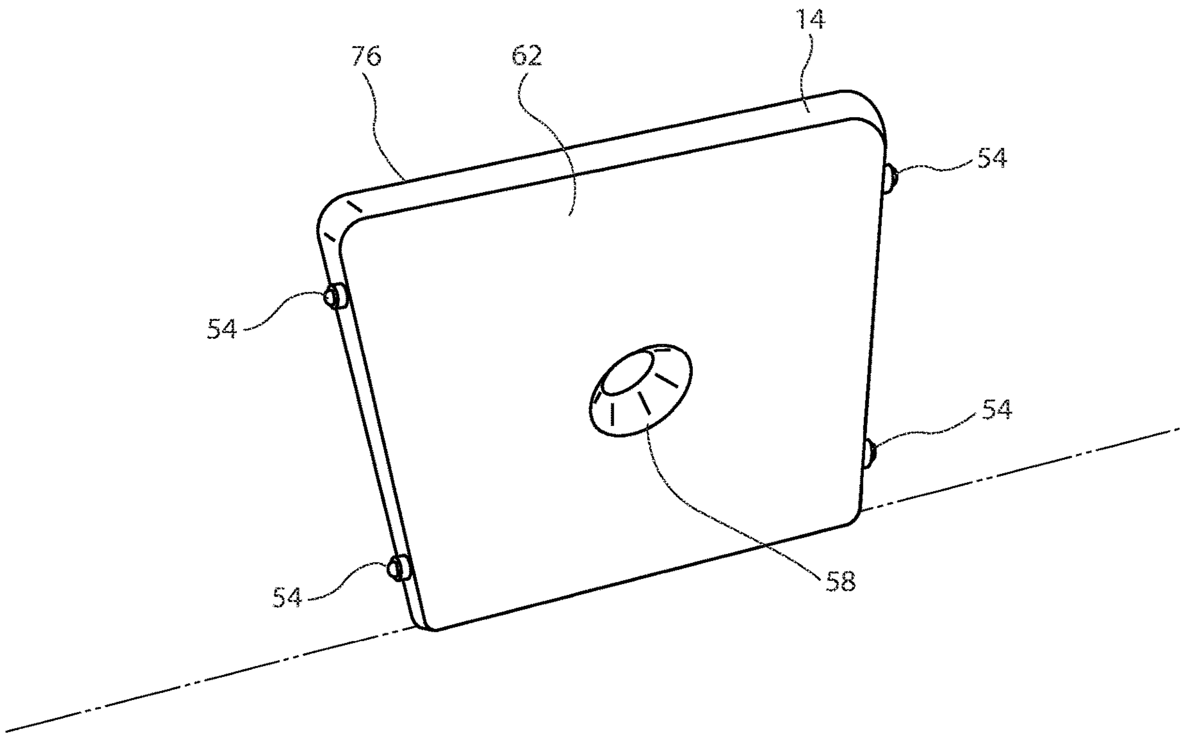
FIG. 12 is a perspective view of the clamp plate of the glass panel clamp assembly of FIG. 2.

With reference to FIG. 2, an exploded perspective view of the improved glass panel clamp assembly 10 of the present invention is depicted. The improved glass panel clamp assembly 10 improves upon the prior art glass panel clamp assembly of FIG. 1 by providing a glass panel clamp assembly which includes a clamp base and a clamp plate that can be installed entirely from outside the shower enclosure.

The improved glass panel clamp assembly 10 of the present invention includes a clamp base 12, a clamp plate 14, a floating nut 16, a clamp screw or bolt 18, a rear trim panel 20 and a front trim panel 22. In an installed glass panel clamp assembly 10, a glass panel 24 is secured between the clamp base 12 and the clamp plate 14.

With reference to FIGS. 2-6, the clamp base 12 comprises a vertical plate 26 with a floor mounting tab 28 integrally formed with the vertical plate. Formed within the vertical plate 26 is a keyhole shaped nut retention feature 29 comprising a nut access region 30 which is formed adjacent to and blends in with a slot 32. The nut access region 30 is cut into or relieved in the vertical plate 26. The nut access region 30 serves or functions to guide the floating nut 16 into a groove or undercut 38 surrounding the slot 32.

Formed within an interior of the nut access region 30 is a through-hole 34 which perforates an inboard face 36 of the vertical plate 26. The slot 32 includes an interior face 31 and flats 50. The groove 38 having a depth 64 is formed within the vertical plate 26 and circumscribes the perimeter of the slot 32 and consequently is deeper than the slot 32. The vertical plate 26 of the clamp base also includes edge protrusions 54 which are configured to engage with engagement recesses 56 formed in the rear trim panel 20.

With reference to FIGS. 2-6 and 13, the floating nut 16 comprises a nut body 40, a rim 42, flats 44 and a threaded bore 46. The nut access region 30 of the vertical plate 26 is of sufficient diameter so that the rim 42 of the floating nut 16 is able to drop into the nut access region 30. The flats 44 of the floating nut 16 are sized so as to be in a slip fit relationship with the flats 50 of the slot 32.

In the exemplary embodiment, the clamp plate 14 is a rectangular plate with a chamfered through-hole 58 for receipt of the clamp screw 18. The clamp plate 14 has an inboard face 76 that bears against a face of a glass panel 24 when a glass panel is installed using the improved glass panel clamp assembly 10.

Figure 13:
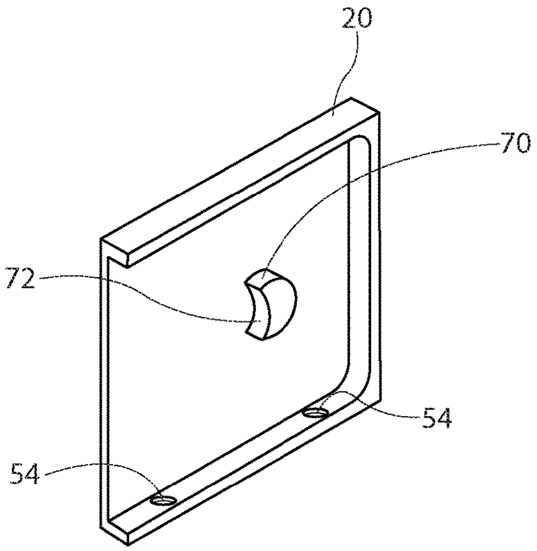
FIG. 13 is a perspective view of the rear trim cover of the glass panel clamp assembly of FIG. 2.
Figure 14:
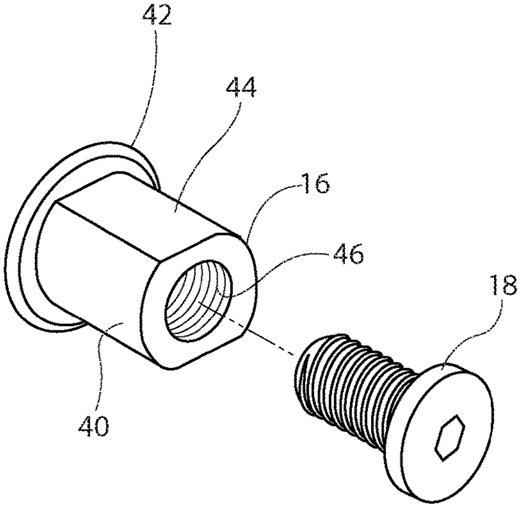
FIG. 14 is an enlarged perspective view of the floating nut used in the glass panel clamp assembly of FIG. 2.
Figure 15:
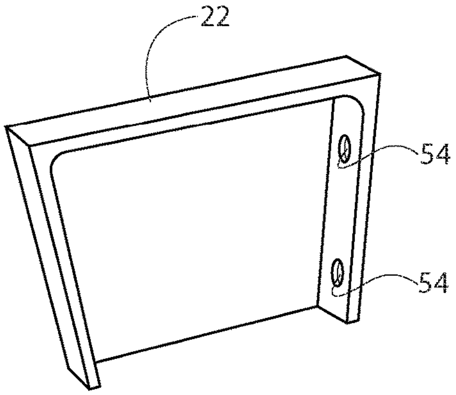
FIG. 15 is a perspective view of the front trim cover of the glass panel clamp assembly of FIG. 2.

With reference to FIGS. 2 and 13, the rear trim panel 20 is configured to be installed over the vertical plate 26 of the clamp base 12 prior to installation in a shower floor or sill. The rear trim panel 20 includes a half-moon shaped protrusion 70 that slides through the through-hole 34 in the nut access region 30 in the vertical plate 26 of the clamp base 12. A curved face 72 of the half-moon shaped protrusion 70 bears against a rim 42 of the floating nut 16 and holds the floating nut 16 in position in the slot 32 in the vertical plate 26 during assembly.

The rear trim panel 20 includes engagement recesses 56 which engage with mating edge protrusions 54 of the vertical plate 26. This configuration allows the rear trim panel 20 to snap over or onto the vertical plate 26 of the clamp base 12 and remain secured to the vertical plate 26 thereafter.

The front trim panel 22 is installed over the clamp plate 14 and conceals the clamp screw 18. Like the rear trim panel 20, the front trim panel 22 includes engagement recesses 56 which engage with mating edge protrusions 54 formed on the clamp plate 14 and allow the front trim panel 22 to be snapped over or onto the clamp plate 14. The front and rear trim panels 22 and 20 provide the improved glass panel clamp assembly 10 with a pleasing aesthetic appearance.

With reference to FIGS. 1-13, the improved glass panel clamp assembly 10 of the present invention is installed as follows. In a first step, the clamp base 12 is position on a shower floor or sill 84 where a glass panel 24 is desired to be installed. (See FIG. 3.) In a second step, a mounting screw 82 is positioned in the mounting hole 80 of the floor mounting tab 28 and is driven into the shower floor or sill 84, typically with a power screwdriver. The mounting hole 80 is chamfered so that the head of the mounting screw 82 is flush with the top surface of the floor mounting tab 28 when installed.

In a third step, the rim 42 of the floating nut 16 is dropped into the nut access region 30 and is then slid into the groove 38 wherein the rim 42 of the floating nut 16 is constrained within walls 52 (see FIG. 5) of the groove 38. The rim 42 of the floating nut 16 is sized so that is constrained between the walls 52 of the groove 38. That is, the rim 42 of the floating nut 16 is has a diameter larger than a width 66 of the slot 32, but less than a width 86 (see FIG. 6) of the groove 38 and therefore cannot be pulled out of the groove 38 from a direction perpendicular to a front face 68 of the vertical plate 26. The diameter of the rim 42 of the floating nut 16 being less than the width 86 of the groove 38 allows the rim 42 to slide within the groove 38.

In a fourth step, the rear trim panel 20 is snapped over the vertical plate 26 of the clamp base 12. When the rear trim panel 20 is snapped over the vertical plate 26, the half-moon shaped protrusion 70 slides inside or through the through-hole 34 formed in the vertical plate 26 and the face 72 of the half-moon shaped protrusion 70 abuts the face 74 (see FIG. 12) of the floating nut 16 (see FIG. 13) and thereby holds the floating nut 16 in place during subsequent assembly operations. (See FIG. 7.)

In a fifth step, a glass panel 24 having a clearance hole 88 is installed on the clamp base 12. To install the glass panel 24 on the clamp base 12, the glass panel 24 is positioned to that the floating nut extends into the clearance hole 88. A bottom edge of the glass panel 24 rests upon a top face of the mounting tab 28 which supports the glass panel 24, during installation. (See FIG. 8.) In a sixth step, the clamp plate 14 is positioned so that the through-hole 58 is aligned with the threaded bore 46 of the floating nut 16 is aligned with the through-hole 58. The through-hole 58 is chamfered to receive the head 60 of the clamp screw 18 in order that the head 60 is flush with an outboard face 62 of the clamp plate 14.

In a seventh step, the clamp screw 18 is disposed in the through-hole 58 and is rotated such that the threads of the clamp screw 18 engage the threads of the threaded bore 46 of the floating nut 16. (See FIG. 9.) In this position, the glass panel 24 is sandwiched between an outboard face 78 of the vertical plate 26 and the inboard face 76 of the clamp plate 14. In an eighth step, the clamp screw 18 is torqued within a predetermined range to generate sufficient clamping force to secure the glass panel 24 between the vertical plate 26 of the clamp base 12 and the clamp plate 14. In a ninth and final step, the front trim panel 22 is snapped into place over the clamp plate 14.

It will be appreciated that the improved glass panel clamp assembly 10 of the present invention improves upon the prior art by providing a glass panel clamp assembly that can be installed from outside of a shower enclosure, thereby simplifying the construction of glass panel shower enclosures.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. An improved glass panel clamp assembly, comprising:

a clamp base, a clamp plate, a floating nut, a clamp screw, and a trim panel;

wherein, the clamp base includes a vertical plate;

wherein, the vertical plate includes a circular nut access region having a concentric hole, the nut access region adjacent to a slot having a groove which extends around the slot;

wherein, the floating nut is insertable into the nut access region from above concentric hole;

wherein, the floating nut is slidable within the groove of the slot;

wherein, the trim panel is attachable to the vertical plate and includes a protrusion having a curved portion which protrudes through the concentric hole in the nut access region and abuts and a rim of the floating nut and prevents the floating nut from moving upwardly when the floating nut is disposed in the slot and the trim panel is secured to the vertical plate; and wherein a hole in the clamp plate is alignable with the floating nut so that the clamp screw may engage with the floating nut when inserted through the hole in the clamp plate.

2. The improved glass panel clamp assembly of claim 1, wherein the protrusion on the trim panel is half-moon shaped.

3. The improved glass panel clamp assembly of claim 1, wherein the trim panel is attached to the vertical plate by means of protrusions formed on the vertical plate which engage with recesses formed on the trim panel.

4. The improved glass panel clamp assembly of claim 1, further including an additional trim panel which is attachable to the clamp plate.

5. The improved glass panel clamp assembly of claim 4, wherein the additional trim panel is attached to the clamp plate by means of protrusions formed on the clamp plate which engage with recesses formed on the trim panel.

6. The improved glass panel clamp assembly of claim 1, wherein the nut access region formed in the vertical plate adjacent to the slot functions to guide the floating nut into the groove extending the slot.

7. The improved glass panel clamp assembly of claim 1, wherein the hole in the clamp plate is chamfered in order that a head of the clamp screw is flush with an outboard surface of the clamp plate when the clamp screw is installed.

8. An improved glass panel clamp assembly for use with a shower enclosure, comprising:

a clamp base, a clamp plate, a trim panel, a floating nut and a clamp screw;

wherein, the clamp base includes a vertical plate having a mounting tab configured to attach to a sill of a shower enclosure;

wherein, the vertical plate includes a slot and a circular nut access region having a concentric hole;

wherein, the floating nut is insertable into the nut access region from above the concentric hole;

the nut access region adjacent to the slot having a groove formed within and extending around a perimeter of the slot;

wherein, the floating nut is slidable within the groove;

wherein, the trim panel is attachable to the vertical plate and includes a protrusion having a curved portion which extends through the concentric hole in the nut access region of the vertical-plate and abuts a rim of the floating nut and prevents the floating nut from moving upwardly when the floating nut is disposed in the slot and the trim panel is secured to the vertical plate; and wherein a hole in the clamp plate is alignable with the floating nut so that the clamp screw may engage with the floating nut when inserted through the hole in the clamp plate.

9. The improved glass panel clamp assembly for use with a shower enclosure of claim 8, further including a trim panel attachable to a face of the vertical plate.

10. The improved glass panel clamp assembly for use with a shower enclosure of claim 9 wherein, the vertical plate includes a hole disposed adjacent to the slot.

11. The improved glass panel clamp assembly for use with a shower enclosure of claim 9 wherein, the trim panel is attachable to a face of the vertical plate and includes a protrusion which protrudes through the hole in the vertical plate, the protrusion abutting and securing the floating nut when the floating nut is disposed in the slot and the trim panel is secured to the vertical plate.

12. The improved glass panel clamp assembly of claim 11, wherein the protrusion on the trim panel is half-moon shaped.

13. The improved glass panel clamp assembly for use with a shower enclosure of claim 9, wherein the trim panel is attached to the vertical plate by means of protrusions formed on the vertical plate which engage with recesses formed on the trim panel.

14. The improved glass panel clamp assembly for use with a shower enclosure of claim 8 wherein, the floating nut includes a threaded bore that is engageable with threads of the clamp screw.

15. The improved glass panel clamp assembly for use with a shower enclosure of claim 8, further including an additional trim panel which is attachable to the clamp plate.

16. The improved glass panel clamp assembly for use with a shower enclosure of claim 15, wherein the additional trim panel is attached to the clamp plate by means of protrusions formed on the clamp plate which engage with recesses formed on the additional trim panel.

17. The improved glass panel clamp assembly for use with a shower enclosure of claim 8, wherein the nut access region functions to guide the floating nut into the groove around the slot.

18. An improved glass panel clamp assembly for use in a shower enclosure, comprising:

a clamp base, a clamp plate, a trim panel, a nut and a clamp screw;

wherein, the clamp base includes a vertical plate having a face and at least one mounting tab;

wherein the at least one mounting tab is configured to attach to a sill of a shower enclosure;

wherein, the vertical plate includes a circular nut access region having a concentric hole, the nut access region adjacent to a slot having an undercut which extends around a perimeter of the slot;

wherein, the floating nut is insertable in the nut access region from above the concentric hole and is slidable within the undercut of the slot; and wherein, the trim panel is attachable to the vertical plate and includes a protrusion having a curved portion which extends through the hole in the vertical-plate and engages a rim of the floating nut and prevents the floating nut from moving upwardly when the floating nut is disposed in the slot and the trim panel is secured to the vertical plate; and wherein a hole in the clamp plate is alignable with the nut so that the clamp screw may engage with the nut when inserted through the hole in the clamp plate.

* * * * *